(12) United States Patent
Xie et al.

(10) Patent No.: US 6,865,226 B2
(45) Date of Patent: Mar. 8, 2005

(54) STRUCTURAL ANALYSIS OF VIDEOS WITH HIDDEN MARKOV MODELS AND DYNAMIC PROGRAMMING

(75) Inventors: Lexing Xie, New York, NY (US);
Shih-Fu Chang, New York, NY (US);
Ajay Divakaran, Denville, NJ (US);
Huifang Sun, Cranbury, NJ (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 626 days.

(21) Appl. No.: 10/005,623

(22) Filed: Dec. 5, 2001

(65) Prior Publication Data

US 2003/0103565 A1 Jun. 5, 2003

(51) Int. Cl.[7] .................................................. H04N 7/12
(52) U.S. Cl. ................ 375/240.08; 382/243; 348/397.1
(58) Field of Search ....................... 375/240.08, 240.24, 375/240.23, 240.04; 348/397.1, 699, 700, 722; 386/68, 52, 69; 382/243, 103

(56) References Cited

U.S. PATENT DOCUMENTS 6,072,542 A * 6/2000 Wilcox et al. ............... 348/722
6,683,968 B1 * 1/2004 Pavlovic et al. ............ 382/103
2003/0081937 A1 * 5/2003 Li .................................. 386/52

OTHER PUBLICATIONS

John McEachen and Abdullah Cay, Masking compressed video connection utilization in ATM networks, IEEE Sep. 2001, pp. V–145 to V–148.*

Ahsun Murad and Thomas Fuja, Exploiting the residual redundancy in motion estimation vectors to improve the quality of compressed video transmitted over noisy channels, IEEE Jan. 1998, pp. 497–501.*

* cited by examiner

Primary Examiner—Gims Philippe
(74) Attorney, Agent, or Firm—Dirk Brinkman; Andrew J. Curtin

(57) ABSTRACT

A method analyzes a high-level syntax and structure of a continuous compressed video according to a plurality of states. First, a set of hidden Markov models for each of the states is trained with a training video segmented into known states. Then, a set of domain specific features are extracted from a fixed-length sliding window of the continuous compressed video, and a set of maximum likelihoods is determined for each set of domain specific features using the sets of trained hidden Markov models. Finally, dynamic programming is applied to each set of maximum likelihoods to determine a specific state for each fixed-length sliding window of frames of the compressed video.

19 Claims, 4 Drawing Sheets

STRUCTURAL ANALYSIS OF VIDEOS WITH HIDDEN MARKOV MODELS AND DYNAMIC PROGRAMMING

FIELD OF THE INVENTION

The invention relates generally to the field of video analysis, and more particularly to analyzing structures of domain specific videos.

BACKGROUND OF THE INVENTION

As digital video becomes more pervasive, efficient ways of analyzing the content of videos become necessary and important. Videos contain a huge amount of data and complexity that make the analysis very difficult. The first and most important analysis is to understand high-level structures of videos, which can provide the basis for further detailed analysis.

A number of analysis methods are known, see Yeung et al. "Video Browsing using is Clustering and Scene Transitions on Compressed Sequences," Multimedia Computing and Networking 1995, Vol. SPIE 2417, pp. 399–413, February 1995, Yeung et al. "Time-constrained Clustering for Segmentation of Video into Story Units," ICPR, Vol. C. pp. 375–380 August 1996, Zhong et al. "Clustering Methods for Video Browsing and Annotation," SPIE Conference on Storage and Retrieval for Image and Video Databases, Vol. 2670, February 1996, Chen et al., "ViBE: A New Paradigm for Video Database Browsing and Search," Proc. IEEE Workshop on Content-Based Access of Image and Video Databases, 1998, and Gong et al., "Automatic Parsing of TV Soccer Programs," Proceedings of the International Conference on Multimedia Computing and systems (ICMCS), May 1995.

Gong et al. describes a system that used domain knowledge and domain specific models in parsing the structure of a soccer video. Like other prior art systems, a video is first segmented into shots. A shot is defined as all frames between a shutter opening and closing. Spatial features (playing field lines) extracted from frames within each shot are used to classify each shot into different categories, e.g., penalty area, midfield, corner area, corner kick, and shot at goal. Note that that work relies heavily on accurate segmentation of video into shots before features are extracted. That method also requires an uncompressed video.

Zhong et al. also described a system for analyzing sport videos. That system detects boundaries of high-level semantic units, e.g., pitching in baseball and serving in tennis. Each semantic unit is further analyzed to extract interesting events, e.g., number of strokes, type of plays—returns into the net or baseline returns in tennis. A color-based adaptive filtering method is applied to a key frame of each shot to detect specific views. Complex features, such as edges and moving objects, are used to verify and refine the detection results. Note that that work also relies heavily on accurate segmentation of the video into shots prior to feature extraction. In short, both Gong and Zhong consider the video to be a concatenation of basic units, where each unit is a shot. The resolution of the feature analysis does not go finer than the shot level.

Thus, generally the prior art is as follows: first the video is segmented into shots. Then, key frames are extracted from each shot, and grouped into scenes. A scene transition graph and hierarchy tree are used to represent these data structures. The problem with those approaches is the mismatch between the low-level shot information, and the high-level scene information. Those only work when interesting content changes correspond to the shot changes.

In many applications such as soccer videos, interesting events such as "plays" cannot be defined by shot changes. Each play may contain multiple shots that have similar color distributions. Transitions between plays are hard to find by a simple frame clustering based on just shot features.

In many situations, where there is substantial camera motion, shot detection processes tend to segment erroneously because this type of segmentation is from low-level features without considering the domain specific high-level syntax and content model of the video. Thus, it is difficult to bridge the gap between low-level features and high-level features based on shot-level segmentation. Moreover, too much information is lost during the shot segmentation process.

Videos in different domains have very different characteristics and structures. Domain knowledge can greatly facilitate the analysis process. For example, in sports videos, there are usually a fixed number of cameras, views, camera control rules, and a transition syntax imposed by the rules of the game, e.g., play-by-play in soccer, serve-by-serve in tennis, and inning-by-inning in baseball.

Tan et al. in "Rapid estimation of camera motion from compressed video with application to video annotation," IEEE Trans. on Circuits and Systems for Video Technology, 1999, and Zhang et al. in "Automatic Parsing and Indexing of News Video," Multimedia Systems, Vol. 2, pp. 256–266, 1995, described video analysis for news and baseball. But very few systems consider high-level structure in more complex videos such as a soccer video.

The problem is that a soccer game has a relatively loose structure compared to other videos like news and baseball. Except the play-by-play structure, the content flow can be quite unpredictable and happen randomly. There is a lot of motion, and view changes in a video of a soccer game. Solving this problem is useful for automatic content filtering for soccer fans and professionals.

The problem is more interesting in the broader background of video structure analysis and content understanding. With respect to structure, the primary concern is the temporal sequence of high-level video states, for example, the game states play and break in a soccer game. It is desired to automatically parse a continuous video stream into an alternating sequence of these two game states.

Prior art structural analysis methods mostly focus on the detection of domain specific events. Parsing structures separately from event detection has the following advantages. Typically, no more than 60% of content corresponds to play. Thus, one could achieve significant information reduction by segmenting out portions of the video that correspond to break. Also, content characteristics in play and break are different, thus one could optimize event detectors with such prior state knowledge.

Related art structural analysis work pertains mostly to sports video analysis, including soccer and various other games, and general video segmentation. For soccer video, prior work has been on shot classification, see Gong above, scene reconstruction, Yow et al., "Analysis and Presentation of Soccer Highlights from Digital Video," Proc. ACCV, 1995, December 1995, and rule-based semantic classification of Tovinkere et al., "Detecting Semantic Events in Soccer Games: Towards A Complete Solution," Proc. ICME 2001, August 2001.

For other sports video, supervised learning has been used to recognize canonical views such as baseball pitching and tennis serve, see Zhong et al., "Structure Analysis of Sports Video Using Domain Models," Proc. ICME 2001, August 2001.

Hidden Markov models (HMM) have been used for general video classification and for distinguishing different types of programs, such as news, commercial, etc, see Huang et al., "Joint video scene segmentation and classification based on hidden Markov model," Proc. ICME 2000, pp. 1551–1554 Vol.3, July 2000.

Heuristic rules based on domain specific features and dominant color ratios, have also been used to segment play and break, see Xu et al., "Algorithms and system for segmentation and structure analysis in soccer video," Proc. ICME 2001, August 2001, and U.S. patent application Ser. No. 09/839,924 "Method and System for High-Level Structure Analysis and Event Detection in Domain Specific Videos," filed by Xu et al. on Apr. 20, 2001. However, variations in these features are hard to quantify with explicit low-level decision rules.

Therefore, there is a need for a framework where all the information of low-level features of a video are retained, and the feature sequences are better represented. Then, it can become possible to incorporate a domain specific syntax and content models to identify high-level structure to enable video classification and segmentation.

SUMMARY OF THE INVENTION

The invention can be used to analyze the structure of a continuous compressed video, that is a video that has not been first been segmented into shots. Specifically, the method according to the invention can be used to analyze high-level structures of domain specific video, such as videos of soccer games.

While prior art methods have focused on the detection of special events, such as goals or corner kicks, the present invention is concerned with generic structural elements of the game. The invention defines two mutually exclusive states of the game, play and break, based on the rules of soccer.

The invention extracts a domain specific set of features from the video, e.g., dominant color ratios and motion intensities, based on the special syntax and content characteristics of soccer videos. Each state of the game has a stochastic structure that is modeled with a set of hidden Markov models (HMM). Finally, standard dynamic programming techniques are used to obtain the maximum likelihood classification of the game into the two states.

The method according to the invention uses formal statistical techniques to model domain specific syntactic constraints, rather than constructing heuristic rules directly as in the prior art. In addition, simple, but effective features are extracted from a compressed video to capture the content syntax.

More specifically, a method analyzes a high-level syntax and structure of a continuous compressed video according to a plurality of states. First, a set of hidden Markov models for each of the states is trained with a training video segmented into known states.

Then, a set of domain specific features are extracted from fixed-length sliding windows of the continuous compressed video, and a set of maximum likelihoods is determined for each set of domain specific features using the sets of trained hidden Markov models. Finally, dynamic programming is applied to each set of maximum likelihoods to determine a specific state for each fixed-length sliding window of frames of the compressed video.

DETAILED DESCRIPTION OF THE PREFERRED EMBODIMENT

Soccer Game Semantics

Figure 1:
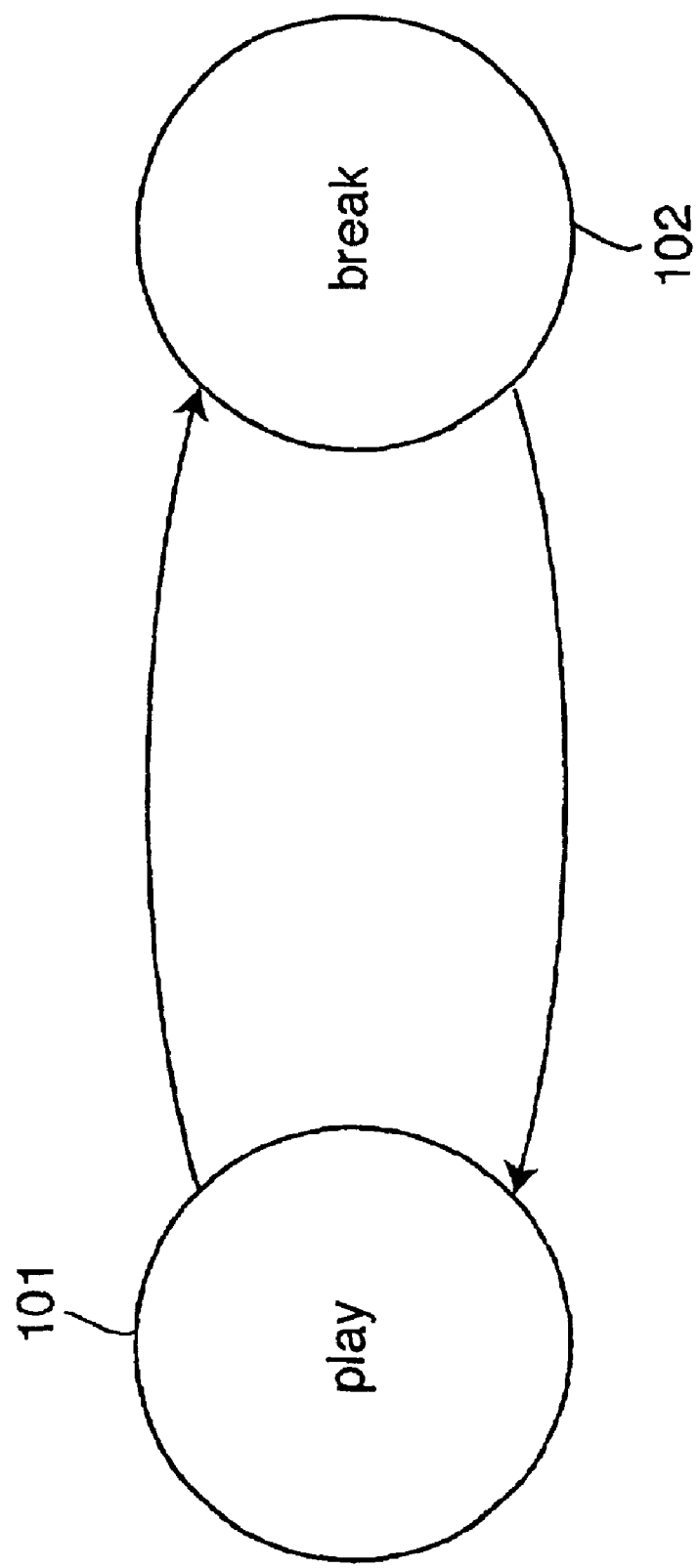
FIG. 1 is a diagram of states of a soccer video.

For the purpose of our invention, and as shown in FIG. 1, we define a set of mutually exclusive and complete semantic states for a domain specific video. For example, if the video is of a soccer game, then the states are play 101 and break 102. The game is out of play or in break whenever "the ball has completely crossed the goal line or touch line, whether on the ground or in the air" or "the game has been halted by the referee," otherwise the game is in play, see "Laws of the Game," International Football Associations Board, Published by Fédération Internationale de Football Association (FIFA), Zurich, Switzerland, July 2001.

Classifying frames in a compressed soccer video into play and break states is hard because of the absence of a canonical scene, such as the serve scene in a tennis video or the pitch scene in a baseball video. The loose temporal structure, i.e., play and break state transitions and highlights of the game, e.g., goal, corner kick, shot, etc., does not have a deterministic relationship with other perceivable events, as opposed to volleys in tennis which are always preceded by a serve. Yet, identifying the play and break states is interesting because it enables one to segment out irrelevant information to reduce the video content by as much as half. Classifying high-level structures of videos also has application in play-by-play browsing, editing, and play-break game statistics analysis.

Soccer Video Syntax

The soccer video syntax refers to the typical production style and editing patterns that help the viewer understand and appreciate the game. Two major factors influencing the syntax are the producer and the game itself. The purpose of syntax is to emphasize the events, as well as to attract the viewer's attention, for example, by using cutaways. Specifically, the soccer video syntax can be characterized by some rules-of-thumb observed by sports video producers: (1) convey global status of the game; (2) closely follow action and capture highlights, see Burke et al., "Sports photography and reporting," Chapter 12, in Television field production and reporting, 2nd Ed, Longman Publisher USA, 1996.

We extract two salient features from the compressed video to capture this syntax implicitly, namely the dominant color ratio and the motion intensity. In the preferred embodiment, the dominant color ratio and motion intensity features are extracted from I- and P-frames of the compressed video. For the I-frames the motion intensity is interpolated. Note, again, our method does not require a segmentation of the video along shot boundaries, as in the prior art.

Feature Extraction Dominant Color Ratio

As described by Xu et al. in U.S. patent application Ser. No. 09/839,924 "Method and System for High-Level Structure Analysis and Event Detection in Domain Specific Videos," incorporated herein by reference, the dominant green color of the playing field can be adaptively learned by extracting a dominant hue value throughout a randomly selected set of frames. Hence, we can distinguish green pixels from non-green pixels in each frame of the video.

We define a dominant color-ratio as:

$$\eta_c = \frac{|P_d|}{|P|}, \qquad (1)$$

where P is the set of all pixels in each frame, and $P_d$ is the set of pixels with the dominant color in the frame.

Xu et al. also describe that the ratio $\eta_c$ indicates the type of view in a current shot. Views are categorized as wide or global when showing a large percentage of the playing field in a frame; as medium or zoom-in when less grass is in sight in a frame; and as close-up when there are but a few grass colored pixels in a frame. Moreover, as consistent with the production principles mentioned in the previous section, a play is usually captured by wide view shots interleaved with short medium view shots or close-ups; and a break usually has a majority of close-up and medium view shots.

However, we analyze features uniformly sampled from the video stream rather than the key frame of each view, because shots are neither aligned with the play and break states nor consistent with the camera view, and view detectors tend to give false alarms due to unpredictable camera motion and intense object motion. Xu thresholded the dominant color ratio in order to map it directly to the three types of views.

In contrast, the present invention models the dominant color-ratio with Gaussian observations of a hidden Markov model (HMM).

Motion Intensity

Motion intensity m is determined as an average magnitude of "effective" motion vectors in a frame $$m = \frac{1}{|\Phi|} \sum_\Phi \sqrt{v_x^2 + v_y^2},$$

where $\Phi$ represents the number of macro-blocks, and $\vec{v} = [v_x, v_y]$ is a motion vector for each of the macro-blocks. The average motion intensity roughly estimates the gross motion in the entire frame, including object and camera motion. It carries complementary information to the dominant color feature, and it often indicates the semantics within a particular shot.

For instance, a wide view shot with high motion intensity often results from player motion and camera pan during a play, while a static wide view shot usually occurs when the game has come to a break.

Figure 2:
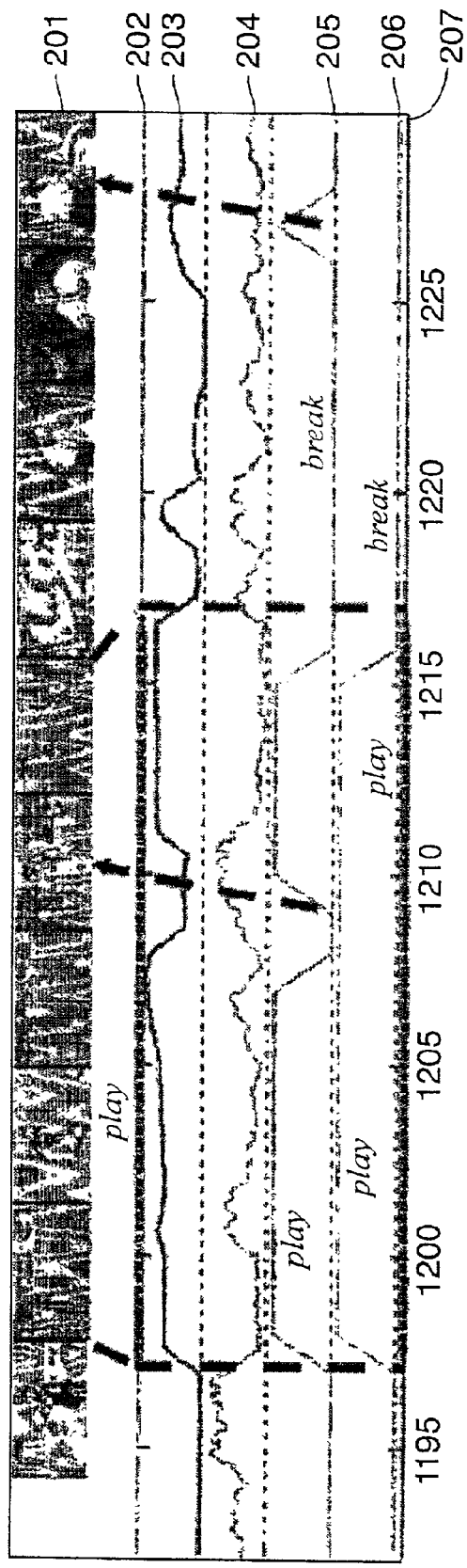
FIG. 2 is a timing diagram of features extracted from a soccer video.

FIG. 2 shows an example clip 201 of a soccer game, including corresponding timing diagram for a ground truth 202, dominant color ratio 203, motion intensity 204, maximum likelihood of states without dynamic programming 205 and with dynamic programming 206, and time 207. The ground-truth is labeled under the principles that the game state does not change unless indicated by a perceivable event, and replays are treated as in play, unless it is not adjacent to a play and shorter than five seconds. The timing diagram is further referenced below with respect to the analysis method according to the invention.

In this clip, distinct feature patterns are associated with the camera view in a particular shot, and state of the game. However, these variations are hard to quantify with explicit low-level decision rules as used in the prior art, therefore, we resort to HMM modeling as described in greater detail below.

Play-Break Classification Method

As stated above, a soccer game has distinct inherent states play (P) 101 and break (B) 102, and each of these two broad states includes different sub-structures such as a switching of point of view in shots, and a variation in motion. This is analogous to speech recognition where models for each spoken word are built and evaluated with a data likelihood, see Rabiner "A tutorial on hidden Markov models and selected applications in speech recognition," Proceedings of the IEEE, v 77 No 2, pp. 257–286, February 1989. In speech recognition, the temporal trajectory of the speech signal is fairly short term, for example, most speech recognition systems use sliding windows of about twenty milliseconds.

However, the domain specific states in soccer are very time diverse, ranging from a fraction of a second, e.g. a penalty kick, to many minutes or more in length. Therefore, we use a set of models for each state to capture structural variations over time. This differs significantly from just using a single homogeneous model for each class as described by Huang et al., "Joint video scene segmentation and classification based on hidden Markov model," Proc. ICME 2000, pp. 1551–1554 Vol. 3, July 2000.

Figure 3:
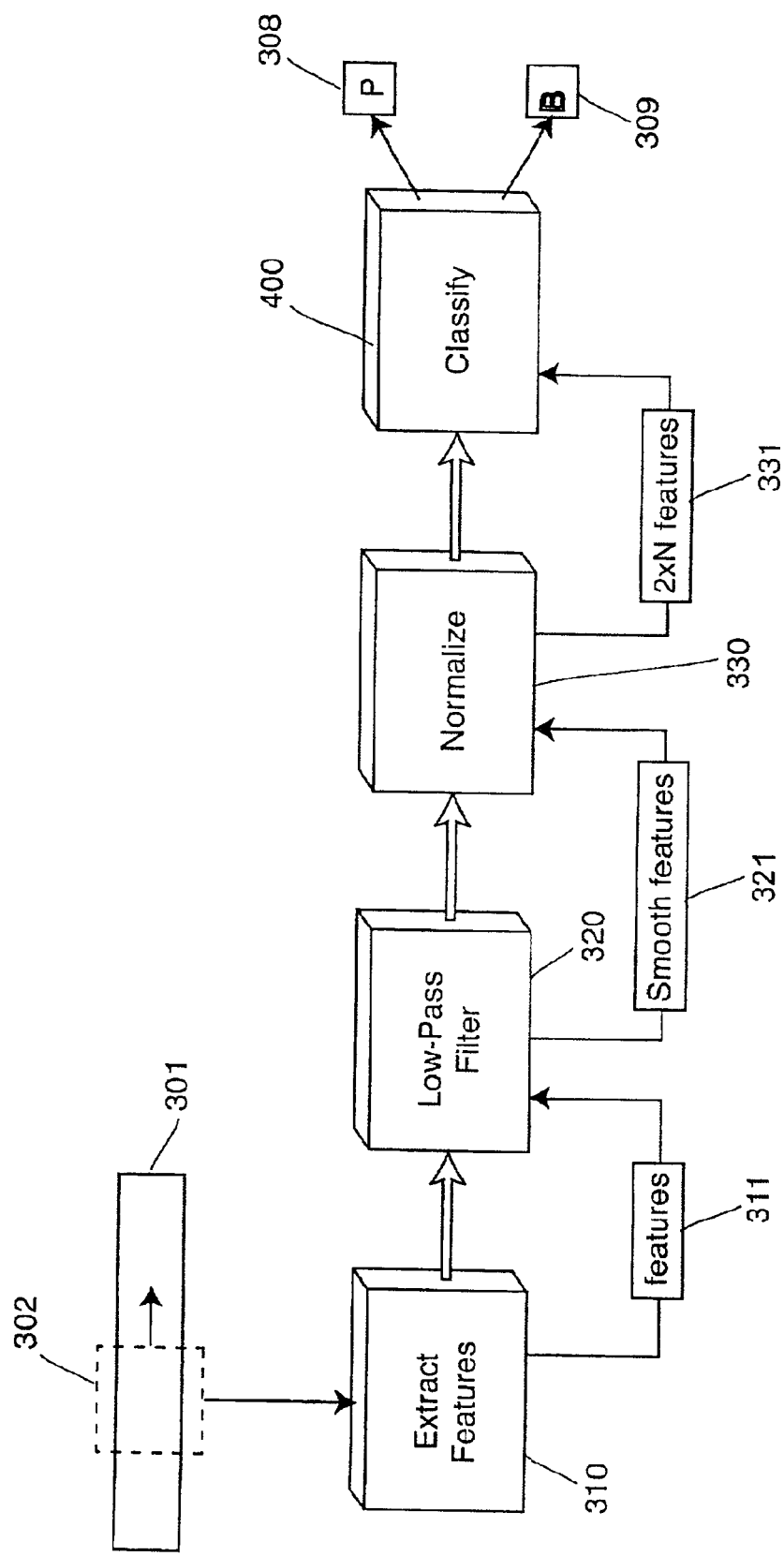
FIG. 3 is a flow diagram of an analysis method according to the invention.

As shown in FIG. 3, we classify a continuous compressed video 301 in a single pass. Hence, we extract 310 a set of domain specific feature vectors from a fixed-length sliding window of frames 302, e.g., a window of three seconds (a clip of ninety frames at 30 fps). The window slides forward in one second increments in each step. It should be noted that the length of the window can be adjusted to other values, e.g. one to five seconds, or longer.

The set of feature vectors 311 can be smoothed by a temporal low-pass filter 320. The smooth features 321 can also be normalized 330 with regard to a mean and variance of the entire set of features. Then, the set of 2×N features 331, where 2 is the dimension of the feature vector and N is the length of the window, is passed to a HMM-dynamic programming module 400 for classification into either one of the P or B classes 308–309. As each the video as classified, it can be segmented. For example, all frames that are classified as break can be discarded, and only the play frames are retained to reduce the content by a substantial fraction.

HMM and Model Maximum Likelihood

Figure 4:
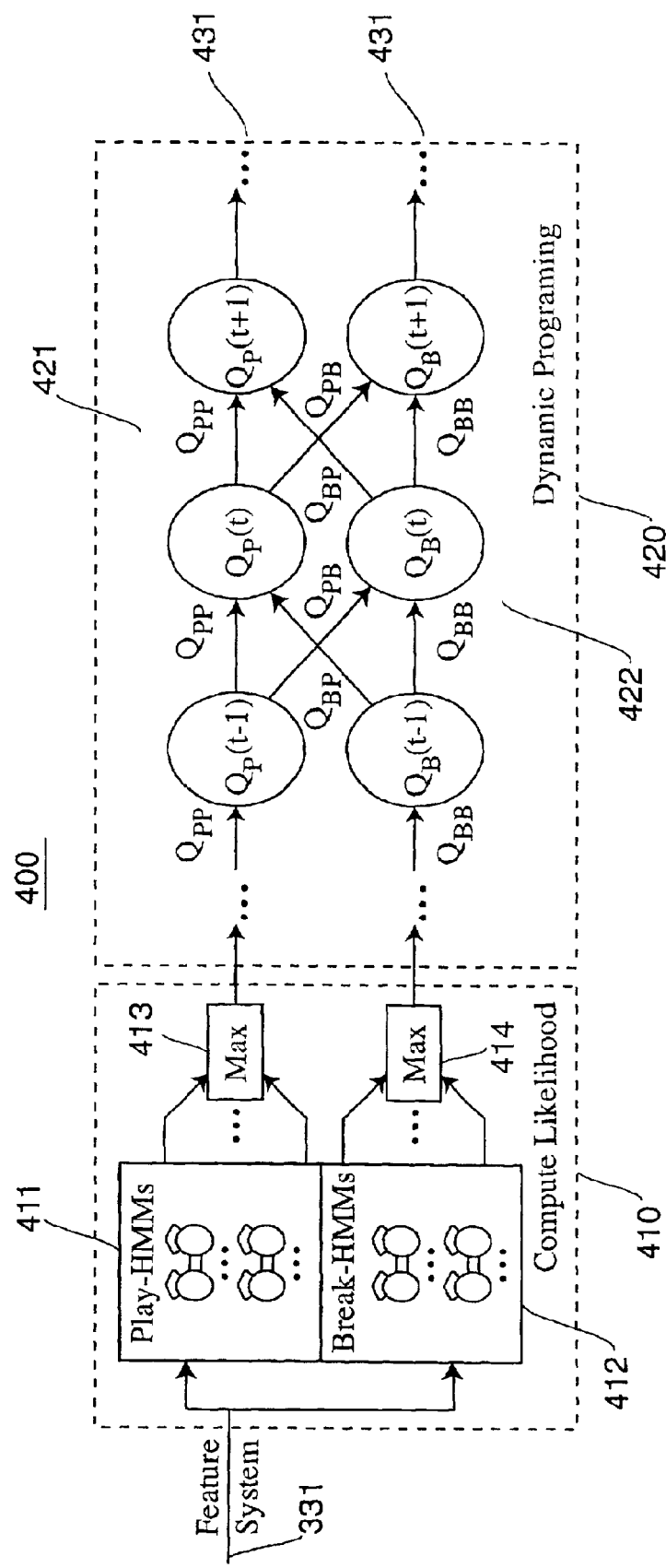
FIG. 4 is a block diagram of hidden Markov models and a lattice grid used by the method of FIG. 3.

FIG. 4 shows the details of the HMM 410 and dynamic programming 420 module 400.

Prior to use, the parameters of the HMM models 411–412 are trained using expectation maximization (EM), and a training video having known states, see Rabiner above.

The training video is segmented into homogeneous play and break portions. This can be done manually, or other known means. Then, the EM for the play-models 411 is conducted over every complete play portion, and the same is done for the break models 412 with break portions. HMM training is not conducted over three-second windows because the HMM structures can take longer time correlation into account, and thus "tolerate" some less frequent events in a state, such as short close-ups within a play.

Experience indicates that the overall accuracy is consistently 2 to 3 percent lower when the models are trained on short segments. In that case, the video tends to be severely over-segmented as some of the short close-ups and cutaways during a play are misclassified as break.

Because training is done for the whole play or break, but classification is done over short segments, results are no worse if only three fully connected models, instead of all six, are used.

Hereinafter, the state play models 411 and their maximum likelihoods 413 are denoted by the subscript P, and the state break models 412 and maximum likelihoods 414 by the subscript B.

A set of trained play and break HMM is $$\Omega \hat{=} \Omega_P \cup \Omega_B = \{P1 \ldots Pn; B1 \ldots Bn\}.$$

We evaluate the feature vector maximum likelihood under each of the models 411–412 to obtain a set of maximum likelihoods 413–414 for each time slice, denoted as:

$$\overline{Q}(t) = [Q_{P1}(t), \ldots Q_{Pn}(t), Q_{B1}(t), \ldots Q_{Bn}(t)],$$

as shown in the left part 410 of FIG. 4.

We train six HMM models each for play and for break, respectively. These include 1/2/3-state fully connected models, 2/3 state left-right models, and a 2-state fully connected model with an entering and an exiting state.

The domain specific features are modeled as mixture of Gaussian distributions, and we have two mixtures per feature dimension per state.

Optimal Path with Dynamic Programming

The HMM maximum likelihoods indicate a "fitness" of each model for every segment, but the long-term correlation is unaccounted for. Thus, finding a global optimal state path $\{s(t)|t=1, 2, \ldots, T, s(t)=P|B\backslash\backslash\}$ using neighborhood information is our next step.

At each time interval, we define two nodes corresponding to the states P and B, respectively. The score of each node is the maximum likelihood of the "best-fit" among all six models for that state:

$$Q_P(t) = \max \{Q_{Pi}(t)\}, Q_B(t) = \max \{Q_{Ni}(t)\}, i=1, \ldots, 6.$$

We also define a transition maximum likelihood from one state of the previous time interval to a state of the current time interval as:

$$Q_{PP}, Q_{PB}, Q_{BP}, Q_{BB},$$

obtained by counting over the training set:

$$Q_{PP} = \log P\{s(t+1)\} = P|s(t) = P = \log \sum_{t=1}^{t-1} \frac{\delta_p(t)\delta_p(t+1)}{\delta_p(t)},$$

where $\delta_P(t)=1$ if $s(t)=P$, and zero otherwise. We define $Q_{PB}$, $Q_{BP}$ and $Q_{BB}$ similarly.

Hence, we have a lattice grid 421, e.g., a Viterbi trellis, with scores associated with each node state and each state transition. Dynamic programming is a well-established technique for finding the optimal path through this lattice grid.

If $\sigma_P(t)$ and $\sigma_B(t)$ are the highest score for a single path that leads to states 431 P and B at time t, respectively, then we can identify the best scores for state P or B at time t+1 by:

$$\sigma_P(t+1) = (1-\lambda)Q_P(t+1) + \{\lambda Q_{PP} + \sigma_P(t)\}, \lambda Q_{PB} + \sigma_B(t)\},$$

and $$\sigma_B(t+1) = (1-\lambda)Q_B(t+1) + \{\lambda Q_{PB} + \sigma_P(t)\}, \lambda Q_{BB} + \sigma_B(t)\}$$

Here, the state transitions are only modeled between play and break, rather than among all of the underlying HMM models, because having this 2×2 transition matrix is sufficient for our play/break classification task, and modeling all possible transitions among all HMMs, which requires a 12×12 transition matrix, is subject to over-fitting.

If the scores $Q_P(t)$ and $Q_B(t)$ at each node are the true posterior probability that a feature vector at time t comes from a play or a break model, then the dynamic programming step 420 is essentially a second-level HMM. Here, constant $\lambda$ weights model likelihoods, and a transition likelihood $\lambda=0$ is equivalent to a maximum likelihood classification; and $\lambda=1$ gives a first-order Markov model. Classification accuracy is not very sensitive to $\lambda$, when $\lambda$ is valued within a reasonable range, e.g., $\lambda \in [0.1, 0.4]$.

Effect of the Invention

The invention can be used to classify and segment a video according to basic semantic elements. First a set of domain specific features are selected and extracted from windowed portions of a continuous video. The classification and segmentation is performed with HMM followed by dynamic programming. High-level domain specific video structures are analyzed to a high degree of accuracy using compressed-domain features and statistical tools.

It should be noted, that the invention can be extended by also using relevant complementary low-features, such as, camera motion, edges, audio, etc, and higher-level object detectors, such as goal and whistle detection. In addition, further details of the content, e.g., different phases in a play, can also be revealed by analyzing the structures within the HMM. Also more general models, such as dynamic Bayesian networks can be used to capture interactions and temporal evolvement of features, objects, concepts and events.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for analyzing a continuous compressed video according to a plurality of states, comprising:

extracting a set of domain specific features from fixed-length sliding windows of frames of the continuous compressed video;

determining a set of maximum likelihoods for each set of domain specific features using a plurality of sets of trained hidden Markov models; and applying dynamic programming to each set of maximum likelihoods to determine a specific state for each fixed-length sliding window of frames of the continuous compressed video.

2. The method of claim 1 wherein the extracting further comprises:

determining a dominant color ratio from each frame; and determining an average motion intensity from each frame.

3. The method of claim 2 wherein the dominant color ratio is $$\eta_c = \frac{|P_d|}{|P|},$$

where P is a set of all pixels in each frame, and $P_d$ is a set of pixels with a dominant color in each frame.

4. The method of claim 2 wherein the average motion intensity is $$m = \frac{1}{|\Phi|} \sum_\Phi \sqrt{v_x^2 + v_y^2},$$

where $\Phi$ represents a number of macro-blocks in each frame, and $\vec{v} = [v_x, v_y]$ is a motion vector for each macro-block.

5. The method of claim 1 wherein a length of the window is in the range of one to five seconds.

6. The method of claim 1 wherein the window slides forward in one second steps.

7. The method of claim 1 further comprising:
smoothing the set of domain specific features with a temporal low-pass filter; and
normalizing the set of domain specific features with regard to a mean and variance of the entire set of domain specific features.

8. The method of claim 1 wherein the plurality of sets of hidden Markov models are trained with a training video having frames with known states.

9. The method of claim 1 wherein each set includes six hidden Markov models.

10. The method of claim 1 wherein the states are P and B, and the sets of hidden Markov models are $$\Omega = \Omega_P \cup \Omega_B = \{P1 \ldots Pn; B1 \ldots Bn\}.$$

11. The method of claim 10 wherein the set of maximum likelihood for each set of domain specific features is $$Q_P(t) = \max\{Q_{Pi}(t)\}, Q_B(t) = \max\{Q_{Ni}(t)\}, i=1, \ldots, 6.$$

12. The method of claim 1 wherein the domain specific features are modeled as a mixture of Gaussian distributions.

13. The method of claim 1 wherein each set of the maximum likelihoods form a trellis grid, and the specific state corresponds to an optimal path through the lattice grid.

14. The method of claim 13 wherein the trellis grid corresponds to states of the sets of hidden Markov models and state transitions of the hidden Markov models.

15. The method of claim 1 further comprising:
segmenting the continuous compressed video according to the specific states.

16. The method of claim 1 wherein the continuous compressed video is of a sporting event, and a dominant color ratio for each frame is determined from a color of a playing field, and an average motion intensity is determined from motion vectors of macro blocks of each frame.

17. The method of claim 16 wherein the sporting event is a soccer game, and the color is green.

18. The method of claim 16 wherein the states are play and break.

19. The method of claim 10 wherein the continuous compressed video is of a soccer game, and a dominant color ratio for each frame is determined from a green color of a playing field, and an average motion intensity is determined from motion vectors of macro blocks of each frame, and the states P and B are play and break in the soccer game.

* * * * *